A. D. COX.
FERTILIZER DISTRIBUTER.
APPLICATION FILED MAR. 6, 1915.
1,157,370.
Patented Oct. 19, 1915.
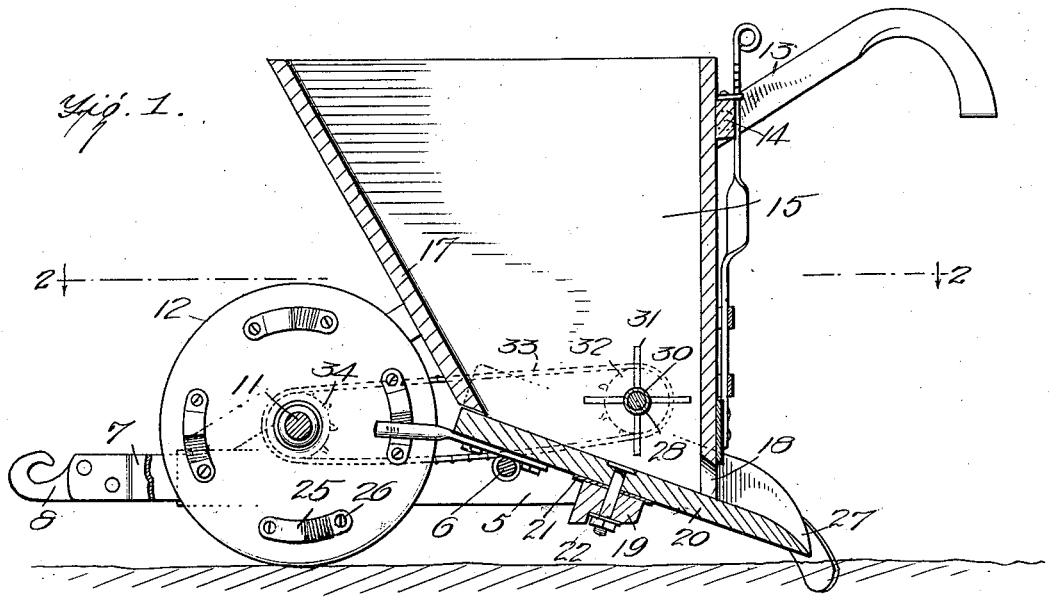
Fig. 1.
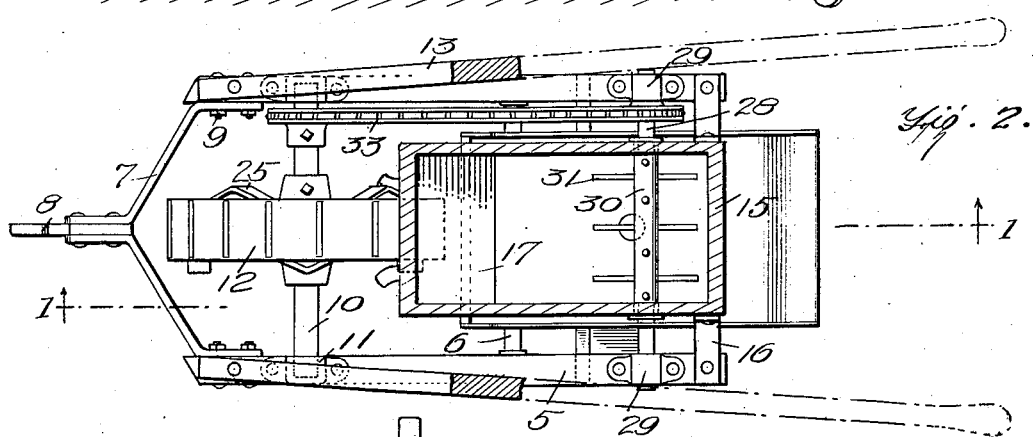
Fig. 2.
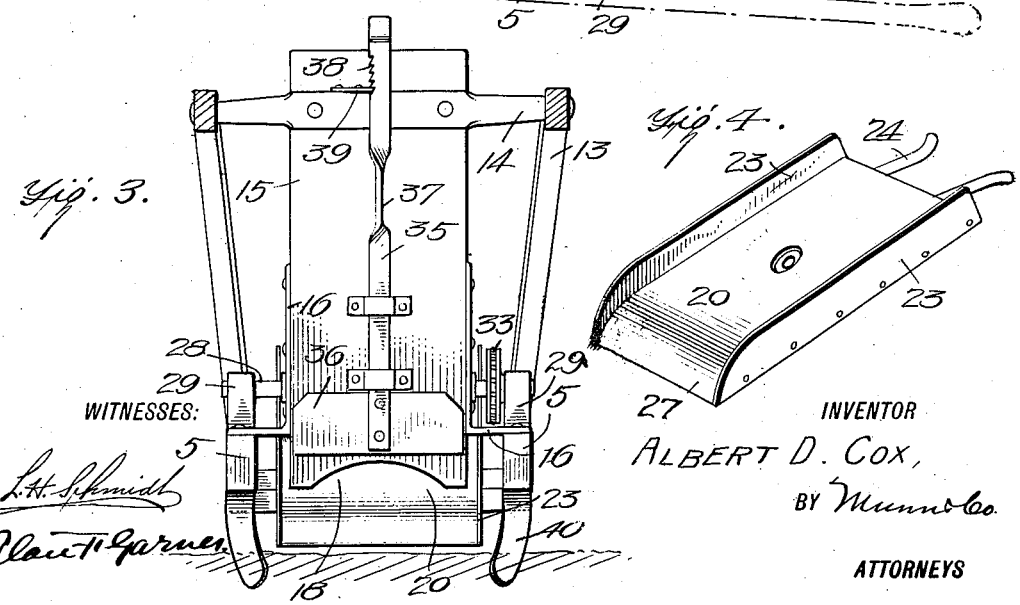
Fig. 3.
Fig. 4.
WITNESSES:
INVENTOR
ALBERT D. COX,
BY Munn & Co.
ATTORNEYS

UNITED STATES PATENT OFFICE.

ALBERT D. COX, OF WINTERVILLE, NORTH CAROLINA.

FERTILIZER-DISTRIBUTER.

1,157,370.

Specification of Letters Patent.

Patented Oct. 19, 1915.

Application filed March 6, 1915. Serial No. 12,542.

*To all whom it may concern:*

Be it known that I, ALBERT D. COX, a citizen of the United States, and a resident of Winterville, in the county of Pitt and State of North Carolina, have invented a certain new and useful Improvement in Fertilizer-Distributers, of which the following is a specification.

This invention relates to an improvement in fertilizer distributers, and more particularly to a distributer to be used for damp or wet fertilizer.

One of the principal objects of the invention is to provide a distributer having a reciprocating bottom or floor adapted to be actuated from the ground or drive wheel of the device whereby to insure even distribution of the fertilizer.

Another object of the invention is to provide a fertilizer distributer including a hopper having a substantially horizontally reciprocatory floor and having a single ground or drive wheel, means being provided between the drive wheel and floor whereby the latter may be oscillated as the device moves along for distributing the fertilizer.

Still another object is to provide an improved fertilizer distributer which will be extremely simple, durable, efficient in operation, and inexpensive to manufacture.

With these and other objects in view which will become apparent as the description proceeds, the invention resides in the construction, combination and arrangement of parts hereinafter more fully described and claimed, and illustrated in the accompanying drawings, in which like characters of reference indicate like parts throughout the several figures, of which—

Figure 1 represents a view in section taken vertically through a fertilizer distributer constructed according to my invention, and on the plane indicated by the line 1—1 of Fig. 2; Fig. 2 represents a view in section taken horizontally on the plane indicated by the line 2—2 of Fig. 1; Fig. 3 represents a view in rear elevation of the device; and Fig. 4 represents a view in perspective of the bottom or floor.

Referring more particularly to the drawing, the framework of the machine includes the side bars 5, connected by a cross bar 6 near their rear ends, and at their forward ends being connected through the medium of a pair of braces or angle irons 7 which diverge from a draft element 8 to which they are secured at their inner ends toward the side bars to which they are fastened in any suitable manner, as by bolts 9.

A shaft 10 is journaled transversely of the frame near its forward end in bearings 11 supported by the side bars, and this shaft has fixed centrally thereon a ground or driving wheel 12. To the side bars near the forward ends thereof are connected the lower ends of handles 13, which handles extend upwardly and rearwardly and near their upper ends are connected by means of a cross bar 14.

The cross bar 14 is in turn connected to the rear face of a hopper 15 to whose sides angle irons 16 are connected, said angle irons at their lower ends extending outwardly and being secured to side bars 5 near the rear ends of the latter. The hopper is thus supported near the rear of the framework and between the side bars thereof. The front wall 17 of the hopper slopes rearwardly as shown clearly in Fig. 1 and said hopper at its lower end is open. The rear wall of the hopper, as shown, is provided with a cut away portion, to form a discharge opening 18.

Connected to the side bars 5 transversely beneath the hopper is a cross bar 19. The upper face of the bar 19 is inclined rearwardly, and on it rests the rectangular bottom or floor 20 of the hopper. A wearing plate 21 is disposed between the bar and floor, and said floor is pivoted upon the bar by means of an inclined bolt or pin 22. The floor 20 slopes rearwardly, and is of a length somewhat greater than the length of the hopper at its bottom, and is also somewhat wider than the hopper, and at its longitudinal edges is provided with the upwardly extending flanges or rails 23. The side flanges or rails occur at such a distance from the side walls of the hopper as not to interfere with the latter or to come in contact therewith when the floor 20 is reciprocated.

Secured beneath the floor and extending forwardly thereof is a pair of spaced arms 24 which extend alongside of drive wheel 12, one on each side thereof. The arms 24 are adapted to be alternately engaged by the cams 25 which are carried in staggered relation on opposite faces of wheel 12. The cams are two-faced and are in the form of strips of metal bowed outwardly at their middle portions. These strips at their ends are connected by suitable fastenings 26 to wheel 12. As will be noted from Fig. 1, the cams 25 occur at a distance inwardly from the periphery of the wheel so as not to engage with the ground as the wheel travels along.

By having the cams disposed in staggered relation on opposite sides of the wheel, the arms 24 will be alternately engaged by the cams whereby a substantially horizontal reciprocatory motion will be imparted to the floor or bottom 20 in order that the fertilizer contained within the hopper will be gradually shaken or jostled downwardly upon the floor and out through the opening 18. As will be noted from Fig. 1 the floor 20 at its rear end extends somewhat beyond the rear wall of the hopper so as to form a chute through which the fertilizer after passing opening 18 may extend in order to be distributed on the ground. To facilitate this, the rear edge of the floor is rounded off as at 27.

Journaled transversely within the hopper just above the floor is a shaft 28 which is carried at its ends in bearings 29 on side bars 5 near the rear ends of the latter. The shaft 28 has disposed thereon within the hopper, a sleeve 30 on which is carried a plurality of radially extending pins or arms 31. This apparatus forms an agitator for keeping the fertilizer in the lower end of the hopper in an agitated and mixed condition so as to prevent its caking, which might result in its inability to pass through the opening 18. The shaft 28 near one end is provided with a sprocket wheel 32 on which an endless chain 33 runs, said chain also running over a sprocket 34 keyed upon shaft 10. In this manner the agitator is directly driven from the ground wheel axle as the distributer moves along.

Extending through a pair of vertically alined straps affixed to the rear wall of the hopper, is a lever or arm 35 secured at its lower end to a gate 36. The lever or arm is twisted at 37 to render its upper end resilient, and said upper end along one edge is provided with a plurality of teeth 38 adapted to engage with a plate 39 carried by cross bar 14 whereby to maintain the lever or arm in vertically adjusted position. The gate 36 is adapted to control the discharge opening 18 whereby to allow of a larger or smaller quantity of fertilizer passing out through said opening.

The cross bar 6 while serving to brace the side bars 5 of the frame, also acts as a support for the arms 24 and the forward end of the floor or bottom 20.

A pair of depending ears or plates 40 are affixed to the under sides of bars 5 at the rear end of the latter and extend downwardly and are slidably twisted so as to present an inclined surface to the direction of travel of the machine. These plates serve the double function of acting as a support for the distributer when the latter is not in motion and also for engaging with the ground as the distributer moves along for mixing the earth with the fertilizer as the latter is deposited.

Such a distributer as I have provided may be readily manipulated in small fields or at corners, by reason of the fact that but a single ground wheel is utilized. It will be found to also provide an extremely even distribution of the fertilizer by reason of the reciprocatory movement of the floor or bottom, and also provides for the thorough agitation of the fertilizer as well as for complete control of the amount of same to be discharged.

Although I have described the preferred embodiment of my invention, I may desire to make such changes in the construction, combination and arrangement of parts thereof, as do not depart from the spirit of the invention and the scope of the appended claims.

I claim:—

1. A fertilizer distributer comprising a frame, a ground wheel journaled thereto, a hopper fixedly carried by the frame and being open at its lower end, a rearwardly inclined cross bar fixedly connected with the frame beneath the hopper, a rearwardly inclined floor supported upon the inclined cross bar beneath the hopper and being pivotally connected with the cross bar at a single point, a second cross bar connected to the frame upon which said second cross bar the said floor in advance of its pivotal point slidably rests, coacting means between the ground wheel and floor for oscillating the latter as the ground wheel rotates, and an agitator arranged within the hopper above the point of support of said floor and adapted to be driven from the ground wheel.

2. A fertilizer distributer comprising a frame, a ground wheel journaled thereto, a hopper fixedly carried by the frame and being open at its lower end, a rearwardly inclined cross bar fixedly connected with the frame beneath the hopper, a rearwardly inclined floor supported upon the inclined cross bar beneath the hopper and being pivotally connected to said cross bar at a single point, a second cross bar connected to the frame and upon which said second cross bar said floor in advance of its pivotal connection slidably rests, and coacting means between the floor and ground wheel for oscillating the former upon rotation of the latter.

3. In a fertilizer distributer, the combination of a fixed hopper, a rearwardly inclined floor unconnected with the hopper, a rearwardly inclined cross bar to which the floor is pivotally connected at a single point, means for oscillating the inclined floor upon its pivotal point, and an agitator arranged within the hopper above the floor and being disposed immediately above the portion of the floor resting against the cross bar.

ALBERT D. COX.

Witnesses:
RAYMAN G. CHAPMAN,
ROBERT L. ABBOTT.